(12) United States Patent
Han et al.

(10) Patent No.: US 6,894,412 B2
(45) Date of Patent: May 17, 2005

(54) ELECTRIC MOTOR

(75) Inventors: Seung-Do Han, Incheon (KR);
Kwan-Yuhl Cho, Seoul (KR);
Hyoun-Jeong Shin, Incheon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/419,956

(22) Filed: Apr. 22, 2003

(65) Prior Publication Data

US 2004/0080237 A1 Apr. 29, 2004

(30) Foreign Application Priority Data

| Oct. 26, 2002 | (KR) | 10-2002-0065691 |
| Oct. 26, 2002 | (KR) | 10-2002-0065689 |
| Nov. 8, 2002 | (KR) | 10-2002-0069333 |

(51) Int. Cl.⁷ .............................................. H02K 47/00
(52) U.S. Cl. ..................................... 310/112; 310/266
(58) Field of Search ..................... 310/156.12, 156.13, 310/156.37, 112, 114, 179; H02K 16/02

(56) References Cited

U.S. PATENT DOCUMENTS

| 1,112,833 A | * | 10/1914 | Poole | 322/30 |
| 3,640,098 A | * | 2/1972 | Eastall | 68/12.06 |
| 3,940,646 A | * | 2/1976 | Buckman | 310/166 |
| 6,269,290 B1 | * | 7/2001 | Egami et al. | 701/22 |

FOREIGN PATENT DOCUMENTS

| DE | 27 04 211 A1 | 8/1978 | | |
| DE | 36 09 351 A1 | 9/1987 | .......... | H02K/16/04 |
| DE | 43 35 966 A1 | 4/1995 | .......... | H02K/1/06 |
| DE | 101 37 192 A1 | 2/2003 | .......... | H02K/17/16 |
| EP | 1 133 045 A1 | 9/2001 | .......... | H02K/16/02 |
| JP | 4-322150 A | 11/1992 | | |
| JP | 4-325860 A | 11/1992 | | |
| JP | 4-331445 A | 11/1992 | | |
| JP | 5-15127 A | 1/1993 | | |
| JP | 5015127 | * | 1/1993 | .......... H02K/17/28 |
| JP | 5-64402 A | 3/1993 | | |
| JP | 5-219698 A | 8/1993 | | |
| JP | 9-172705 | 6/1997 | | |

OTHER PUBLICATIONS

European Search Report.

* cited by examiner

Primary Examiner—Darren Schuberg
Assistant Examiner—Nguyen Hanh
(74) Attorney, Agent, or Firm—Birch, Stewart, Kolasch & Birch, LLP

(57) ABSTRACT

An electric motor includes: a stator having a plurality of first coils with a rotor receiving part formed inside thereof and generating a rotating magnetic field and a plurality of second coils making a pair with the first coils and generating an induction magnetic field induced by the magnetic field of the first coils; a first rotor formed as a hollow permanent magnet, installed in the rotor receiving part and rotated by the magnetic field formed in the first coils and the second coils of the stator; and a second rotor having a rotational shaft fixedly installed at a center of the second rotor, and being installed inside the first rotor so as to be rotated by rotation of the first rotor.

52 Claims, 8 Drawing Sheets

ELECTRIC MOTOR

This nonprovisional application claims priority under 35 U.S.C. §119(a) on Patent Application No (s). 10-2002-0065689 filed in KOREA on Oct. 26, 2002; 10-2002-0065691 filed in KOREA on Oct. 26, 2002 and 10-2002-0069333 filed in KOREA on Nov. 8, 2002, which is (are) herein incorporated by reference.

BACKGROUND OF THE INVENTION

1. Field of the Invention

The present invention relates to an electric motor and, more particularly, to a rotor structure of an electric motor.

2. Description of the Background Art

A shading coil types, single-phase induction motor is constructed such that a stator forms a rotating magnetic field and a stator coil of single phase, and another phase of shading coil are installed at a position of being rotated at a certain angle spatially with respect to the stator coil so that an induction rotor is rotated by an oval-shaped rotating magnetic field to thereby generate a rotational force.

Though the shading coil type single-phase induction motor has a low efficiency, it is advantageous in that it can be implemented at a low cost, and as such, it is widely used for light load use such as a fan motor for a refrigerator, an electric fan for domestic use, etc.

However, the conventional shading coil type single-phase induction motor has the following problems.

That is, in spite of the advantage of implementation of the low-priced motor, a loss is generated from the shading coil to degrade efficiency of the motor. In addition, since a driving force for driving the induction rotor is not uniformly generated, vibration occurs which accompanies a noise.

SUMMARY OF THE INVENTION

Therefore, an object of the present invention is to provide an electric motor in which an additional rotor of a permanent magnet is additionally provided between a stator and a rotor, thereby enhancing efficiency of a motor and reducing vibration and noise.

To achieve these and other advantages and in accordance with the purpose of the present invention, as embodied and broadly described herein, there is provided an electric motor including: a stator having a plurality of first coils with a rotor receiving part formed inside thereof and generating a rotating magnetic field and a plurality of second coils making a pair with the first coils and generating an induction magnetic field induced by the magnetic field of the first coils; a first rotor formed as a hollow permanent magnet, installed in the rotor receiving part and rotated by the magnetic field formed in the first coils and the second coils of the stator; and a second rotor having a rotational shaft fixedly installed at a center of the second rotor, and being installed inside the first rotor so as to be rotated by rotation of the first rotor.

To achieve the above object, there is also provided an electric motor including: a stator having a plurality of first coils generating a rotating magnetic field and a plurality of second coils making a pair with the first coils and being induced by the magnetic field of the first coils to generate an induction magnetic field; a first rotor formed as a hollow permanent magnet enclosing an outer circumference of the stator and being rotated by the magnetic field generated from the first coils and the second coils of the stator; and a second rotor having a rotational shaft fixedly installed at a center of the second rotor and being installed at an outer circumference of the first rotor so as to be rotated by rotation of the first rotor.

To achieve the above object, there is also provided an electric motor including: a first coil forming a rotating magnetic field; a second coil inducted by the magnetic field of the first coil to form a rotating magnetic field; a stator having a plurality of first coil winding parts where the first coil is wound and a plurality of second coil winding parts where the second coil is wound, and having a rotor receiving part therein; a first rotor received in the rotor receiving part and rotated by the magnetic field formed by the first coil and the second coil, and formed as a cylindrical permanent magnet; and a second rotor inserted in the first rotor, in which a rotational shaft is fixed, and rotated by rotation of the second rotor.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
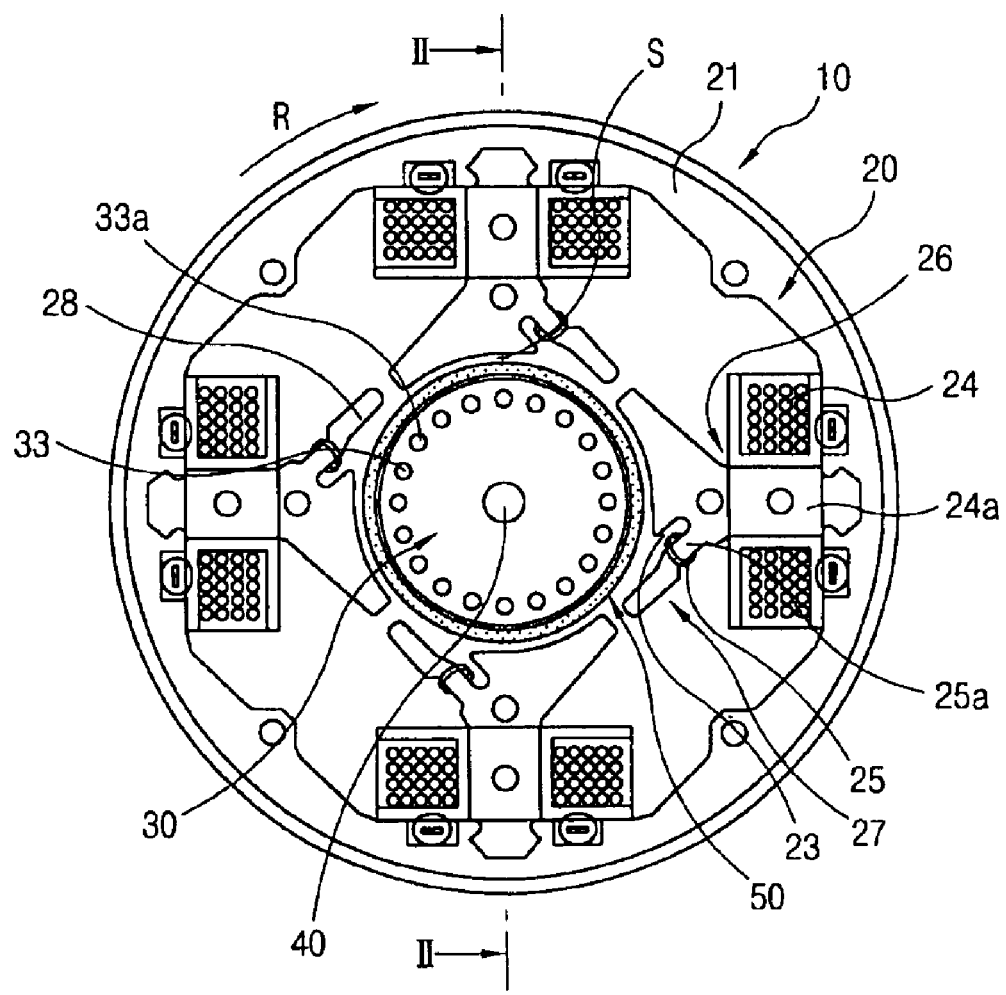
FIG. 1 is a sectional view of an electric motor in accordance with a first embodiment of the present invention.

Reference will now be made in detail to the preferred embodiments of the present invention, examples of which are illustrated in the accompanying drawings.

An electric motor in accordance with a first embodiment of the present invention includes: a stator 20 having a plurality of first coils 24 with a rotor receiving part S formed inside thereof and generating a rotating magnetic field and a plurality of second coils 25 making a pair with the first coils 24 and generating an induction magnetic field induced by the magnetic field of the first coils; a first rotor 50 formed as a hollow permanent magnet, installed in the rotor receiving part S and rotated by the magnetic field formed in the first coils 24 and the second coils 25 of the stator 20; and a second rotor 30 having a rotational shaft 40 fixedly installed at a center of the second coils 25, and being installed inside the first rotor 50 so as to be rotated by rotation of the first rotor 50.

At the center of the second rotor 30, the rotational shaft 40 for transmitting a rotational force to outside is press-fit and fixed, and conductor bars 33 made of conductive material such as aluminum are insertedly fixed through die-casting in a plurality of conductor bar insertion holes 33a formed radially centering around the rotational shaft 40. As the second rotor 30, a squirrel so-called cage induction rotor may be used.

A pair of end rings 34 are installed at upper and lower sides of the second rotor 30 to fix the conductor bars 33 to the second rotor 30.

The first rotor 50 is formed in a cylindrical or hollow shape to have an inner space S into which the second rotor 30 is inserted, and is integrally formed with permanent magnet material.

Figure 2A:
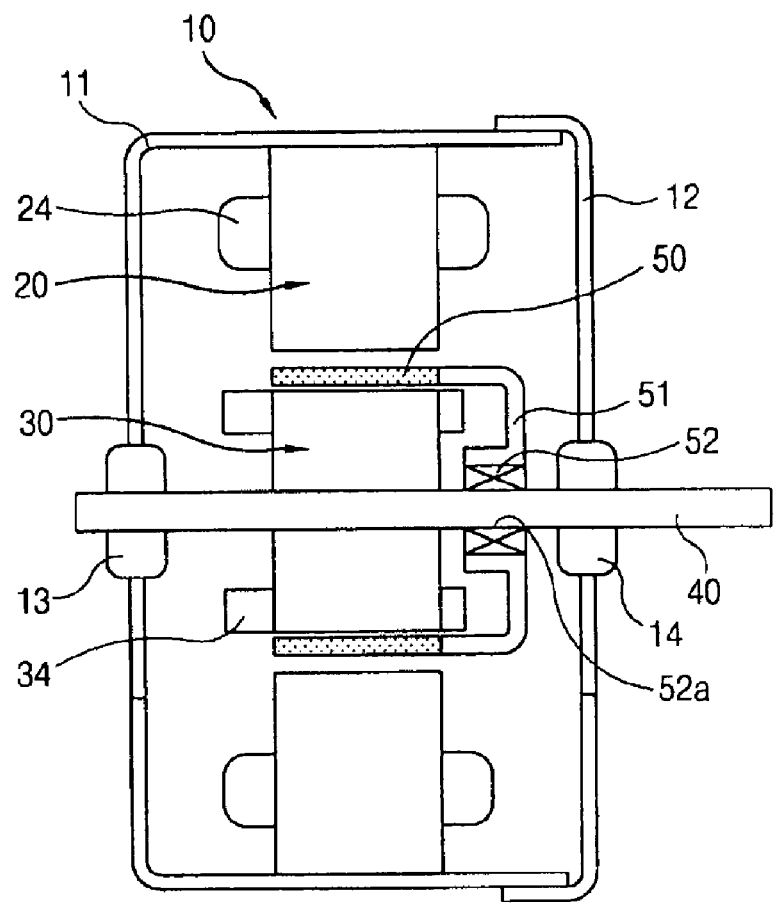
FIG. 2A is a sectional view taken along line II—II of FIG. 1.

The first rotor 50 is freely rotated around the outer circumference of the second rotor 30, and as shown in FIGS. 1 and 2A, the first rotor 50 is fixedly installed at the first rotor support member 51 formed with an insertion hole 52a into which the rotational shaft 40 is rotatably inserted, in order to prevent the first rotor 50 from moving in a longitudinal direction of the rotational shaft 40. The first rotor support member 51 is disposed with a certain distance from the second rotor 30 so as to avoid the interference between the second rotor 30 and the first rotor support member 51.

Figure 2B:
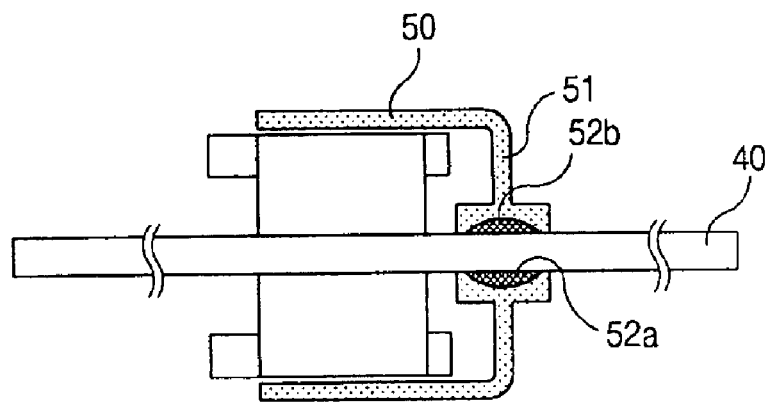
FIG. 2B is a sectional view of another example of the first rotor support member and the first rotor of the motor in FIG. 2A.

The first rotor support member 51 is installed with a cup shape at one side of the second rotor 30, into which the rotational shaft 40 is rotatably inserted, so that the first rotor 50 can be freely rotated by the rotating magnetic field generated from the stator 20, as shown in FIG. 2A. In addition, in order to reduce cost for manufacturing, the first rotor support member 51 and the first rotor 50 are manufactured in one body of magnetic material, and the inner surface of the insertion hole 52a formed in the first rotor support member 51 is provided with a sintered bearing for rotatably supporting the rotation of the rotational shaft 40, as shown in FIG. 2B.

Figure 3:
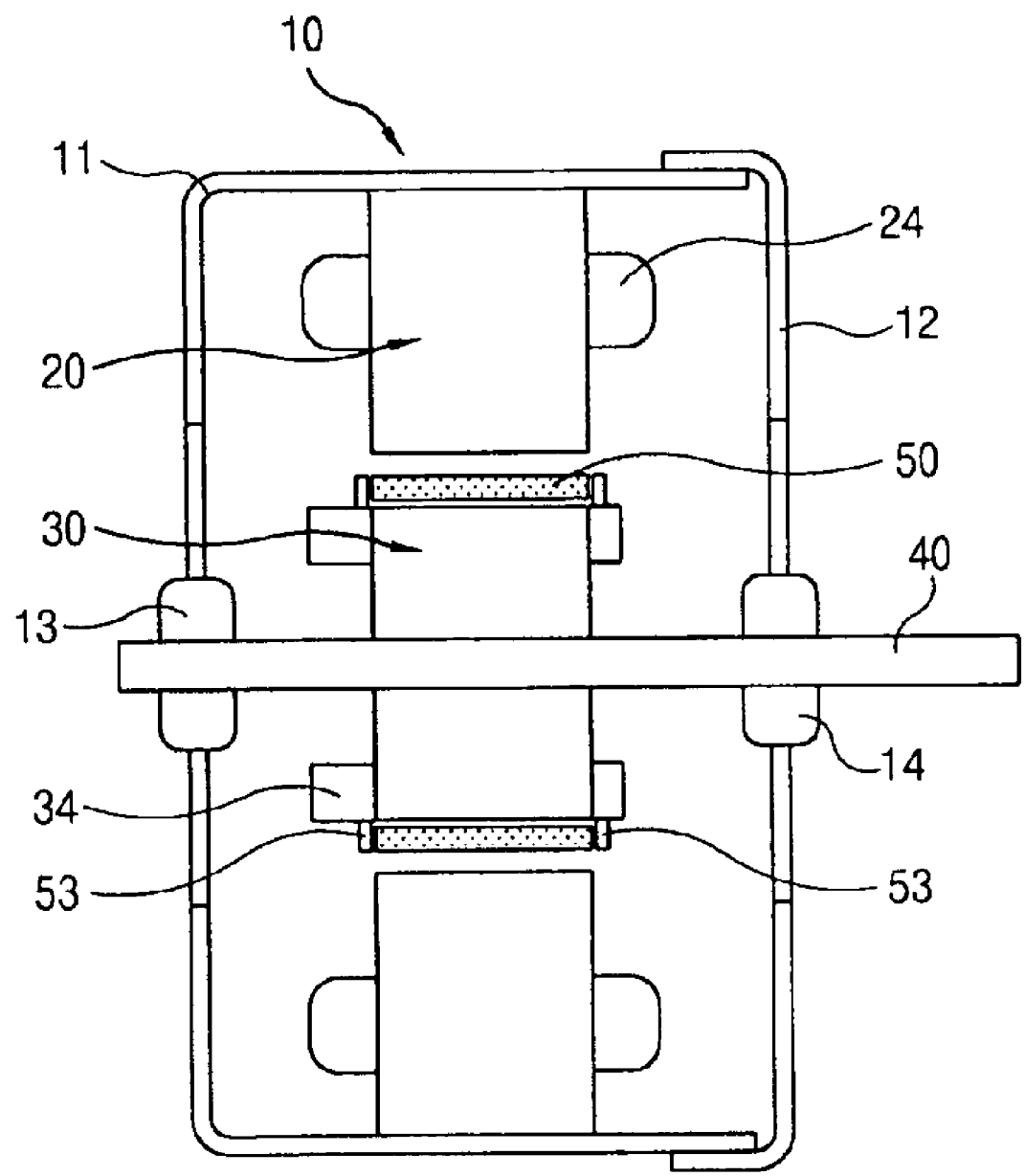
FIG. 3 is a sectional view showing a modification of the electric motor of FIG. 2A.

In order to prevent the first rotor 50 from being moved in a longitudinal direction of the rotational shaft 40, as shown in FIG. 3, a pair of guide units 53 may be also formed protruded in a radial direction of the rotational shaft 40 from an outer circumferential surface of the second rotor 30 or preferably from the end ring 34.

In order to reduce a frictional loss caused by mutual contact of the first rotor 50 and the second rotor 30, it is desirable to be coated with lubricating material on either one or both of the inner circumferential surface of the first rotor 50 and the outer circumferential surface of the second rotor 30.

The stator 20 has a fixed part 21 fixedly installed in the housing 10 which includes a cylindrical housing body 11 with an opening and a cover unit 12 for covering the opening, and is formed as a plurality of stator cores are stacked. Bearings 13 and 14 are installed at the housing body 11 and the cover unit 12 to rotatably support the rotational shaft 40.

The stator 20 includes the first coil winding part 24a where the first coils are wound and the second coil winding part 25a where the second coils 25 are wound. The first coil winding part 24a is disposed radially centering around the rotational shaft 40 and includes a plurality of first stator teeth 26 extended from the fixed part 21 to the rotor receiving part S.

The first stator teeth 26 has a pair of protrusions 27 protruded in a circumferential direction of the rotational shaft 40 (or of the first rotor 50) from an end which faces the rotor receiving part S.

In order to rotate the first rotor 50, the second coil winding part 25a is positioned at a certain angle in a rotational direction R of the rotational shaft 40 from the position of the first coils 24 and formed at the protrusion 27 at the side of the rotational shaft direction R between the pair of protrusions 27. Especially, as shown in FIG. 1, as for the protrusion 27 having the second coil winding part 25a, a groove 23 is formed at the side of the first stator teeth 26, and the second coil winding part 25a is formed near the groove 23.

Figure 4:
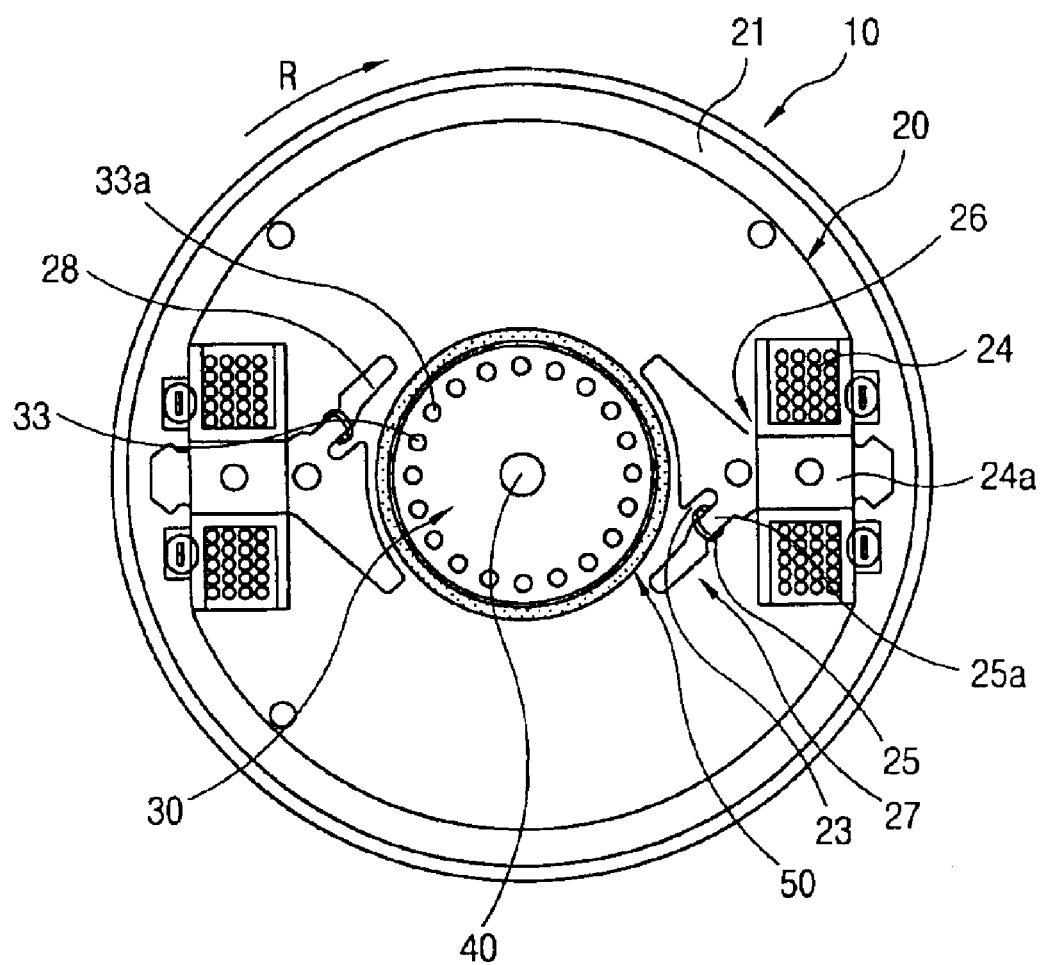
FIG. 4 is a sectional view of an electric motor in accordance with a second embodiment of the present invention.

The first coil winding part 25a and the second coil winding part 25a, or the first coil 24 and the second coil 25 make a pair. The number of pair of The first coil winding part 25a and the second coil winding part 25a, or the first coil 24 and the second coil 25 is one or more according to a required performance of an electric motor. There are two in the first embodiment of the present invention, and there are one in accordance with the second embodiment of the present invention as shown in FIG. 4. The electric motor in accordance with the second embodiment of the present invention as shown in FIG. 4 shows the same construction as that of the first embodiment of the present invention except that the number of the first coil winding parts 24a and the second coil winding parts 25a is different. In particular, if there are provided one or two pairs of first coils 24 and second coils 25, they are formed to be symmetrical centering around the rotational shaft 40.

Figure 5:
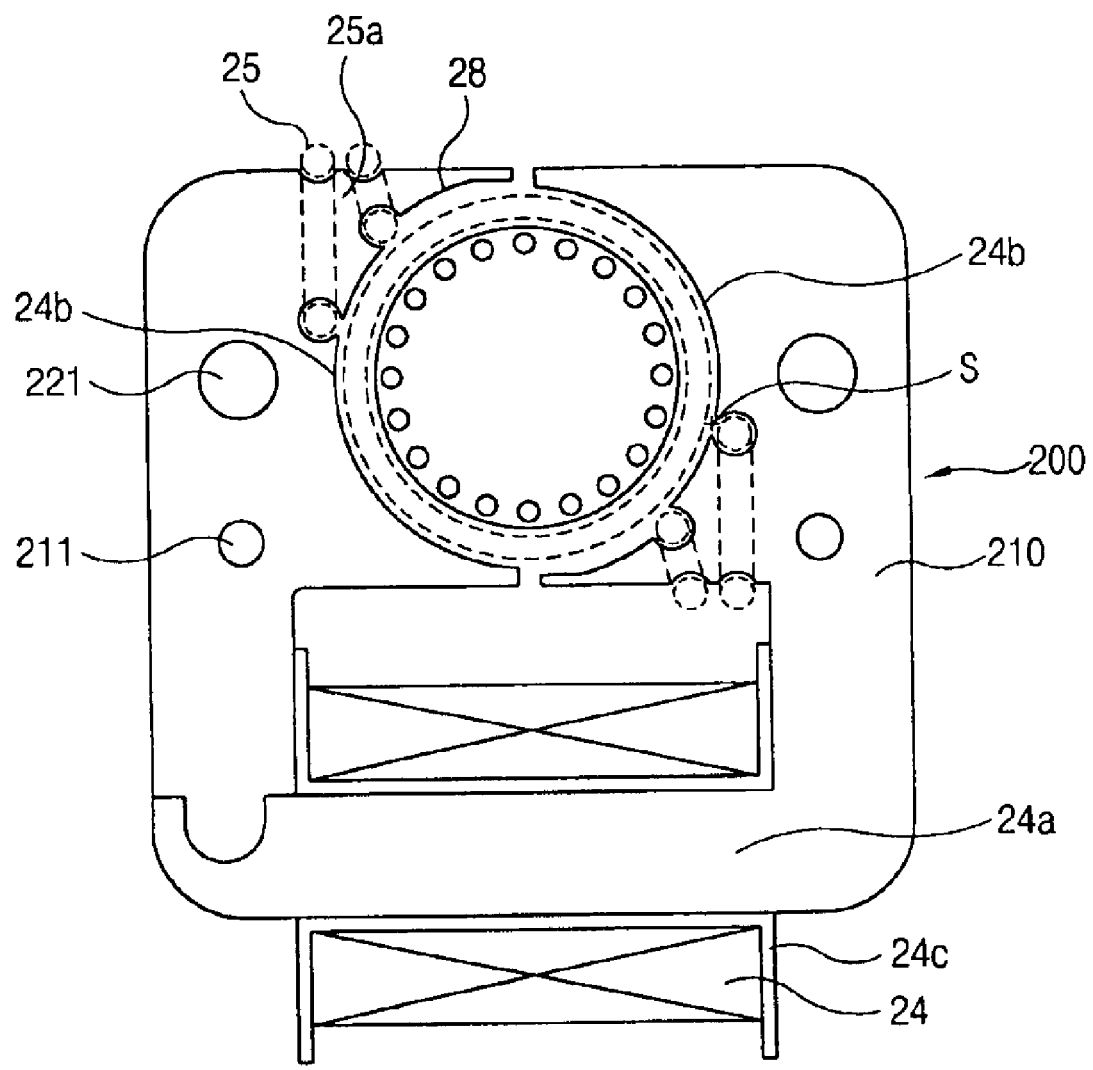
FIG. 5 is a sectional view of an electric motor in accordance with a third embodiment of the present invention.

In the electric motor of the present invention, the stator can be modified with various structures, and as shown in FIG. 5, an electric motor in accordance with the third embodiment of the present invention includes a stator 200 having a pair of stator arms 210 which has a first coil winding part 24a where the first coil 24 is wound, a rotor receiving surface 24b installed at the side of the first coil winding part 24a and forming a rotor receiving part S with a pair of separate spaces G; and a pair of second coil winding parts 25a where the second coils 25 are wound.

The electric motor in accordance with the third embodiment of the present invention has the same construction as that of the first embodiment except for the stator 200. A bobbin 24c is installed at the first coil winding part 24a, in which the first coils 24 are wound.

The stator 200 is formed as a plurality of stator cores are stacked by rivets (not shown), etc. through the through holes 211, and an engaging hole 221 is formed around the rotor receiving part S, into which an engaging member such as a bolt (not shown) is inserted, in order to fix the housing (not shown) or the like to receive the first rotor 50 and the second rotor 30.

An air gap is formed between the stator 20 and the first rotor 50. An air gap enlarged part 28 with an enlarged air gap can be formed at the inner circumferential surface of the stator 20 forming the rotor receiving part S, in order to improve a performance of the motor. As shown in FIGS. 1, 4 and 5, the air gap enlarged part 28 is preferably formed near the second coil winding part 25a where the second coil is wound.

Figure 6:
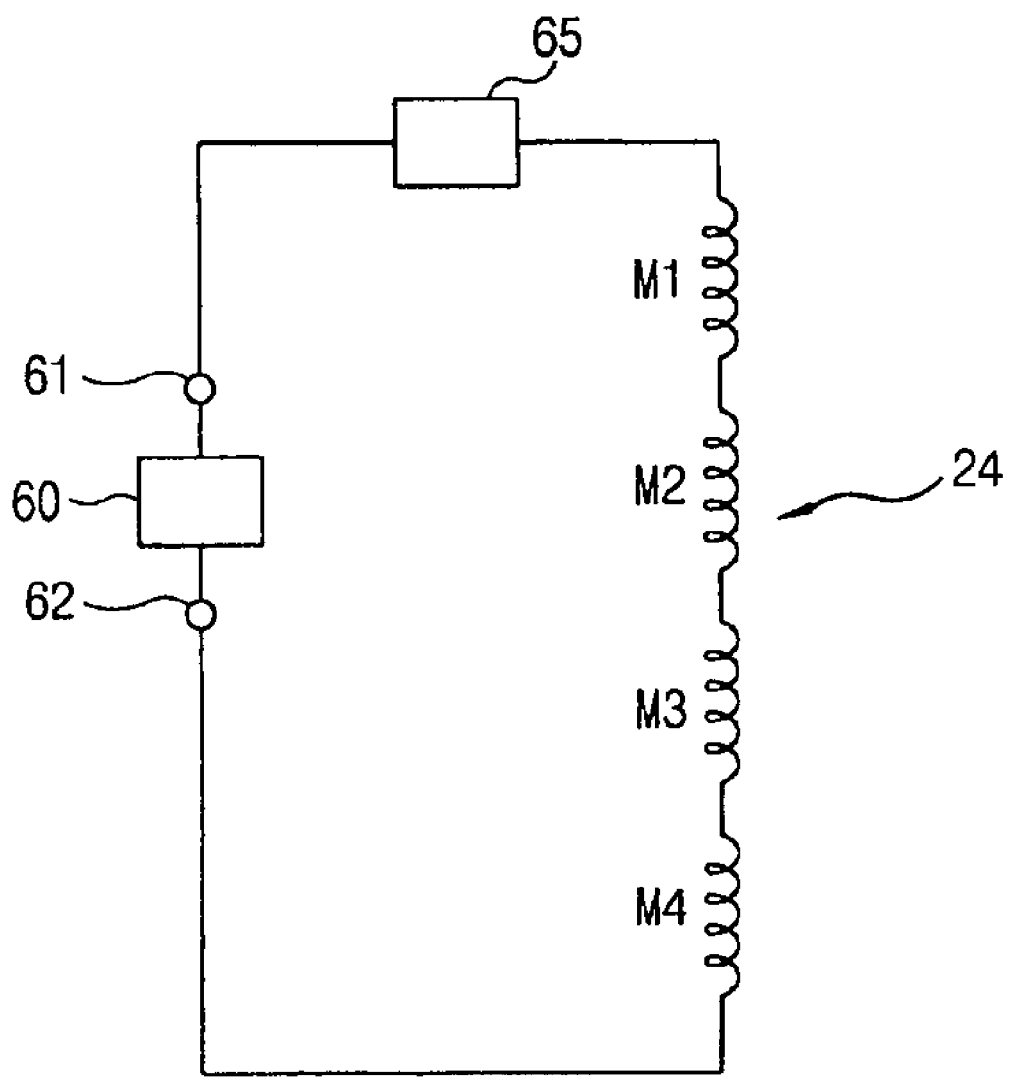
FIG. 6 is a connection diagram of the electric motor in accordance with the present invention.

As shown in FIG. 6, the first coil 24 is connected to an external power source 60 supplying an electric energy through power source terminals 61 and 62. A single-phase utility power can be used as the external power source 60. The connection of the first coils 24 including four windings M1, M2, M3 and M4 is shown in FIG. 6.

Figure 7:
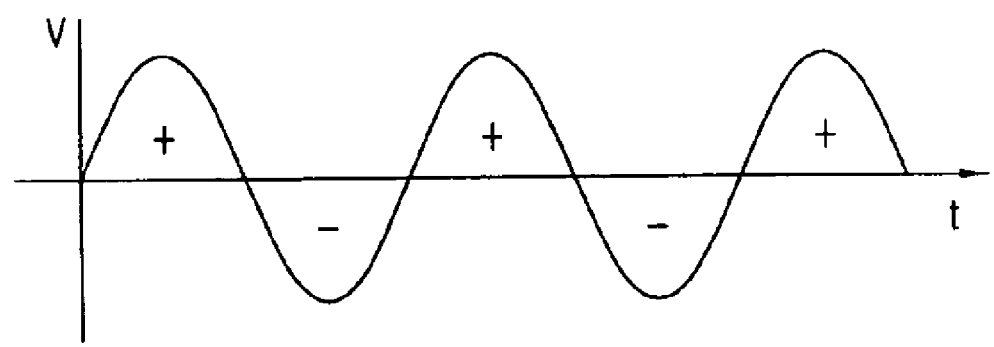
FIG. 7 is a graph showing a wave form of a voltage V applied to the electric motor in accordance with the present invention.

As shown in FIG. 7, the utility voltage makes a waveform with a certain period with respect to time t. With the first rotor 50, a problem arises that the rotational shaft 40 may rotate in reverse as the rotating magnetic field formed by the first coils 24 and the second coils 25 reacts in the reverse direction according to magnitude and phase of voltage applied to the first coils 24 (in FIG. 7, in case of the voltage in the negative (−) region, the first rotor 50 is rotated in a reverse direction).

In order to solve such a problem, the electric motor of the present invention includes a voltage dropping unit 65 which is connected between the first coil 24 and the external power source 60 to drop an applied voltage if the applied voltage of the external power source 60 is greater than a pre-set voltage in starting, and pass the applied voltage as it is in driving with out voltage drop. The voltage dropping unit 65 may be a resistance device such as an Negative Temperature Coefficient (NTC) of which a resistance value R is in inverse proportion to a temperature T.

Figure 8:
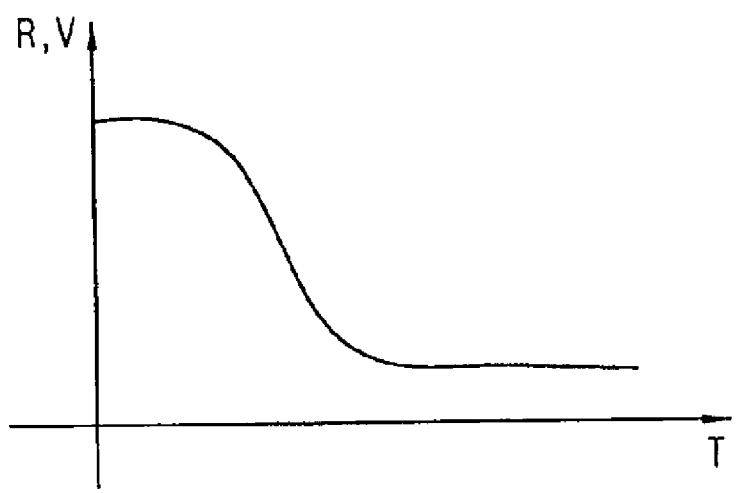
FIG. 8 is a graph showing resistance characteristics of NTC of the electric motor in accordance with the present invention.

FIG. 8 is a graph showing resistance R or voltage V characteristics of the NTC of the electric motor according to the temperature T of the NTC in accordance with the present invention.

The electric motor of the present invention has an operation allowable range for a magnitude of an applied voltage (for example, a minimum allowable voltage and maximum allowable voltage). By controlling the voltage dropping unit 65, the operation allowable range can be adjusted.

In the preferred embodiments of the present invention, the stator 20 is positioned at an outer side of the first rotor 50 and the second rotor 30, but the stator 20 can be installed at the inner side and the second rotor 30 can be installed at the outer side.

Figure 9:
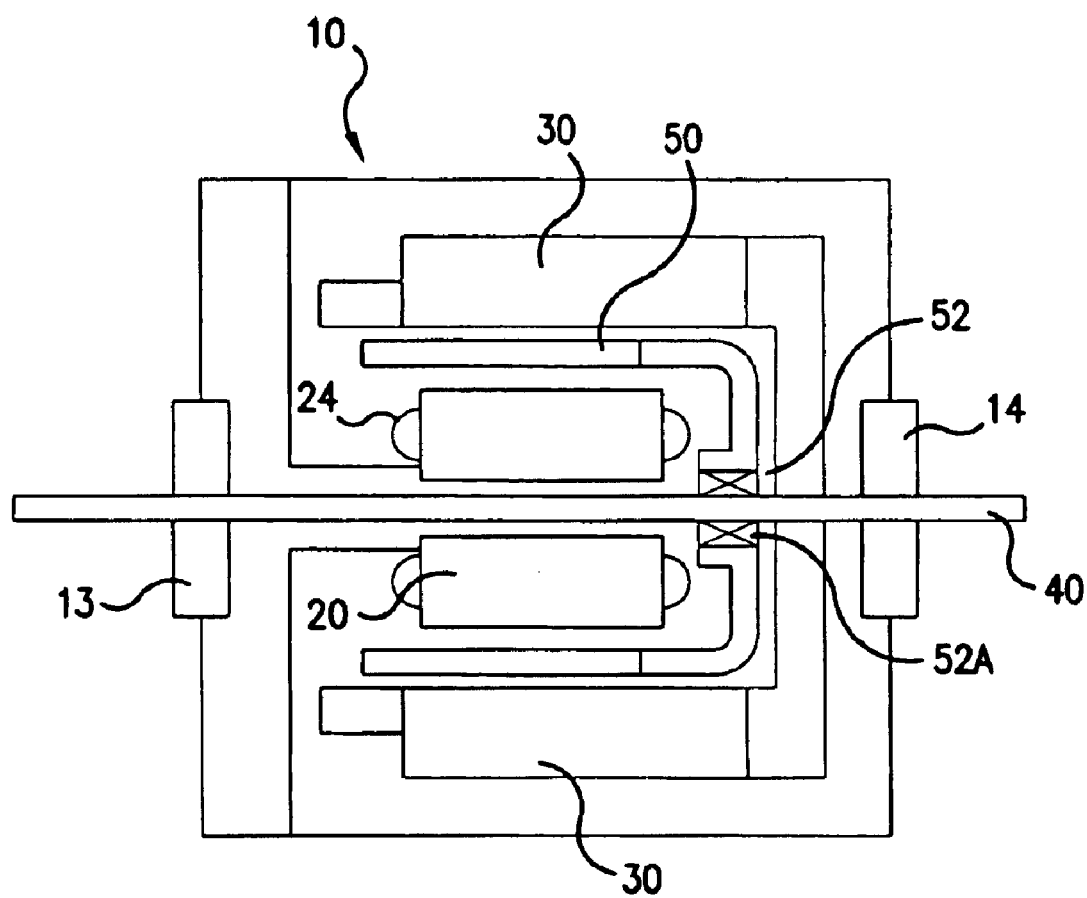
FIG. 9 is a sectional view of an electric motor having a stator surrounding a pair of rotors.

For example, as seen in FIG. 9, the second rotor 30 can be formed in a cylindrical shape, the first coil winding part 24a and the second coil winding part 25a of the stator 20 can be formed at the outer side of the stator 20, and the first rotor 50 can be installed between the second rotor 30 and the stator 20, which have the similar construction to that of the electric motor of the first embodiment or that of the second embodiment of the present invention.

The operation and effect of the electric motor constructed as described above will now be explained.

First, the external power source 60 is applied to the first coil 24 to operate the electric motor. Then, the first coils 24 generate a rotating magnetic field in a sequential order of M1, M2, M3 and M4. Then, an induced rotating magnetic field induced by the first coils 24 is generated in the second coils 25 positioned at a rotated position in a certain angle in the rotational direction R on the basis of the first coils 24 and the rotational shaft 40.

The rotor 50 is rotated by the interaction between the rotating magnetic field formed by the first coils 24 and the second coils 25 and the magnetic flux of the first rotor 50 received in the rotor receiving part S.

At this time, a reverse rotating magnetic field may be formed by a phase of an initially applied voltage, and if the magnitude of the voltage is greater than an allowable voltage, the first rotor 50 is rotated in a reverse direction and driven. However, since the voltage dropping unit 65 drops the voltage applied in the initial starting, so that even if the reverse rotating magnetic field is generated, the first rotor 50 is immediately rotated in the forward direction by reducing the magnitude of the voltage.

In particular, if the NTC is used as the voltage dropping unit 50, as the external voltage 60 is applied to the NTC, the NTC is heated. Then, as the temperature of the NTC goes up, the resistance value of the NTC is reduced, and after some time lapse, the NTC passes most of the applied voltage.

Meanwhile, as the first rotor 50 is rotated, a rotating magnetic field is again generated by the magnetism of the first rotor 50, and the generated rotating magnetic field induces the conductor bars 33a installed in the second rotor 30 according to the electromagnetic induction, thereby rotating the second rotor 30, and resultantly, the rotational shaft 40 press-fit at the second rotor 30 is rotated to thereby generate a rotational force. As a matter of fact, a load such as a fan, etc. is coupled to the rotational shaft 40, so that the rotational force is transferred to outside.

As so far described, the electric motor of the present invention has the following advantages.

That is, for example, by installing an additional rotor of one permanent magnet having hollow space between the existing stator and rotor, a high efficient electric motor can be provided with a simple structure and low production cost.

In addition, by including the voltage dropping unit, the operation range of the electric motor is freely adjusted, so that the efficiency of the motor can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A single-phase electric motor comprising:
   a stator having a plurality of first coils generating a rotating magnetic field from a single-phase power source, and a plurality of second coils generating an induction magnetic field induced by the magnetic field of the first coils, said stator including a rotor receiving part formed inside thereof;
   a first rotor being installed in the rotor receiving part and rotated by the magnetic field formed in the first coils and the second coils of the stator, wherein said first rotor is a hollow permanent magnet; and
   a second rotor having a rotational shaft fixedly installed at a center of the second rotor, and being installed inside the first rotor so as to be rotated by rotation of the first rotor.

2. The single-phase electric motor according to claim 1, wherein the stator includes a plurality of first winding parts protruding inwardly where the first coils are wound and a pair of protrusions protruding in a circumferential direction of the first rotor from an end of each first winding part.

3. The single-phase electric motor according to claim 2, wherein the second coils are wound at one of the pair of protrusions.

4. The single-phase electric motor according to claim 3, wherein the second coil is wound at the protrusion in a rotational direction of the rotational shaft.

5. The single-phase electric motor according to claim 4, wherein said first and second coils comprise exactly two first coils and exactly two second coils.

6. The single-phase electric motor according to claim 4, wherein said first and second coils comprise exactly four first coils and exactly four second coils.

7. The single-phase electric motor according to claim 3, wherein said first and second coils comprise exactly two first coils and exactly two second coils.

8. The single-phase electric motor according to claim 3, wherein said first and second coils comprise exactly four first coils and exactly four second coils.

9. The single-phase electric motor according to claim 2, wherein said first and second coils comprise exactly two first coils and exactly two second coils.

10. The single-phase electric motor according to claim 2, wherein said first and second coils comprise exactly four first coils and exactly four second coils.

11. The single-phase electric motor according to claim 1, wherein said first and second coils comprise exactly two first coils and exactly two second coils.

12. The single-phase electric motor according to claim 1, wherein said first and second coils comprise exactly four first coils and exactly four second coils.

13. The single-phase electric motor according to claim 1, wherein the stator includes a pair of stator arms which has a first coil winding part where the first coils are wound, a rotor receiving surface formed at one side of the first coil winding part and forming a rotor receiving part with a separate space; and a pair of second coil winding parts where the second coils are wound.

14. The single-phase electric motor according to claim 13, wherein the second coil winding parts are installed to be symmetrical centering on the rotational shaft near the separate space in a rotational direction of the second rotor.

15. The single-phase electric motor according to claim 13, wherein the second coils are wound at the second coil winding part which is extended from the first coil winding part and positioned at a rotated position from the first coil winding part in a rotational direction of the rotational shaft.

16. The single-phase electric motor according to claim 15, wherein the rotor receiving part includes an air gap enlarged part with an enlarged air gap formed between the first rotor and the stator, and said enlarged air gap is formed near the second coil winding part.

17. The single-phase electric motor according to claim 13, wherein the rotor receiving part includes an air gap enlarged part with an enlarged air gap formed between the first rotor and the stator, and said enlarged air gap is formed near the second coil winding part.

18. The single-phase electric motor according to claim 13, wherein the second rotor includes a rotor core with the rotational shaft fixedly installed at a center thereof; and a plurality of conductor bars inserted into the second rotor in a longitudinal direction of the rotational shaft radially centering around the rotational shaft.

19. The single-phase electric motor according to claim 13, wherein the first rotor is fixed to a first rotor support member into which the rotational shaft is rotatably inserted.

20. The single-phase electric motor according to claim 19, wherein the first rotor support member is formed in a cup shape.

21. The single-phase electric motor according to claim 13, wherein the second rotor includes a pair of guide units protruding from the second rotor in a radial direction of the rotational shaft to prevent the first rotor from moving in a longitudinal direction of the rotational shaft.

22. The single-phase electric motor according to claim 21, wherein the inner surface of the first rotor or the outer surface of the second rotor is coated with a lubricant material.

23. The single-phase electric motor according to claim 13, wherein the first coil is directly connected to the single-phase power source.

24. The single-phase electric motor according to claim 13, further comprising:
a voltage dropping unit connected between the first coils and the single-phase power source to lower a supply voltage to a pre-set voltage during a starting mode and to pass all of the supply voltage during a normal driving mode.

25. The single-phase electric motor according to claim 13, further comprising:
a resistance device connected between the first coils and the single-phase power source and having a resistance value in inverse proportion to a temperature of the resistance device.

26. The single-phase electric motor according to claim 25, wherein the resistance device is a Negative Temperature Coefficient (NTC).

27. The single-phase electric motor according to claim 1, wherein the second rotor includes a rotor core with the rotational shaft fixedly installed at a center thereof; and a plurality of conductor bars inserted into the second rotor in a longitudinal direction of the rotational shaft radially centering around the rotational shaft.

28. The single-phase electric motor according to claim 1, wherein the first rotor is fixed to a first rotor support member into which the rotational shaft is rotatably inserted.

29. The single-phase electric motor according to claim 28, wherein the first rotor support member is formed in a cup shape.

30. The single-phase electric motor according to claim 28, wherein the first rotor and the first rotor support member are formed of a single body of magnetic material.

31. The single-phase electric motor according to claim 30, wherein the inner surface of an insertion hole into which the rotational shaft is rotatably inserted includes a sintered bearing.

32. The single-phase electric motor according to claim 1, wherein the second rotor includes a pair of guide units protruding from the second rotor in a radial direction of the rotational shaft to prevent the first rotor from moving in a longitudinal direction of the rotational shaft.

33. The single-phase electric motor according to claim 32, wherein the inner surface of the first rotor or the outer surface of the second rotor is coated with a lubricant material.

34. The single-phase electric motor according to claim 1, wherein the first coil is directly connected to the single-phase power source.

35. The single-phase electric motor according to claim 1, further comprising:
a voltage dropping unit connected between the first coils and the single-phase power source to lower a supply voltage to a pre-set voltage during a starting mode and to pass all of the supply voltage during a normal driving mode.

36. The single-phase electric motor according to claim 1, further comprising:
a resistance device connected between the first coils and the single-phase power source and having a resistance value in inverse proportion to a temperature of the resistance device.

37. The single-phase electric motor according to claim 36, wherein the resistance device is a Negative Temperature Coefficient (NTC).

38. The single-phase electric motor according to claim 1, wherein the electric motor is a shading coil single-phase induction motor.

39. The single-phase electric motor according to claim 1, comprising a housing that contains the stator.

40. A single-phase electric motor comprising:
a stator having a plurality of first coils generating a rotating magnetic field from a single-phase power source and a plurality of second coils being induced by the magnetic field of the first coils to generate an induction magnetic field;
a first rotor enclosing an outer circumference of the stator and being rotated by the magnetic field generated from the first coils and the second coils of the stator, wherein said first rotor is a hollow permanent magnet; and
a second rotor having a rotational shaft fixedly installed at a center of the second rotor and being installed at an outer circumference of the first rotor so as to be rotated by rotation of the first rotor.

41. A single-phase electric motor comprising:
a first coil forming a rotating magnetic field and powered by a single-phase power source;
a second coil induced by the magnetic field of the first coil to form an induction rotating magnetic field;
a stator having
 a plurality of first coil winding parts where the first coil is wound,
 a plurality of second coil winding parts where the second coil is wound, and
 a rotor receiving part formed therein;
a first rotor received in the rotor receiving part and rotated by the magnetic field formed by the first coil and the second coil, wherein said first rotor is a cylindrical permanent magnet; and
a second rotor inserted in the first rotor, in which a rotational shaft is fixed, and rotated by rotation of the first rotor.

42. The single-phase electric motor according to claim 41, wherein the first coil winding part protrudes toward the rotor receiving part and includes a pair of protrusions extending from an end of the first coil winding part in a circumferential direction of the rotor receiving part to form the rotor receiving part.

43. The single-phase electric motor according to claim 42, wherein the second coil winding part is formed at the protrusion of the pair of protrusions positioned in a rotational direction of the rotational shaft.

44. The single-phase electric motor according to claim 41, wherein one pair of first coil winding parts or two pairs of first coil winding parts are provided.

45. The single-phase electric motor according to claim 41, wherein the electric motor is a skeleton motor.

46. The single-phase electric motor according to claim 41, wherein the stator includes an air gap enlarged portion with an enlarged air gap formed between the first rotor and the stator, and the air gap is formed near the second coil winding part.

47. The single-phase electric motor according to claim 41, wherein the first rotor is fixed at the first rotor support member where an insertion hole into which the rotational shaft is rotatably inserted is formed.

48. The single-phase electric motor according to claim 41, wherein the second rotor includes a pair of guide units protruding from the second rotor in a radial direction of the rotational shaft to prevent the first rotor from moving in a longitudinal direction of the rotational shaft.

49. The single-phase electric motor according to claim 41, wherein the first coil is connected to the single phase power source.

50. The single-phase electric motor according to claim 41, further comprising:
a voltage dropping unit connected between the first coil and the single-phase power source to lower a supply voltage to a pre-set voltage during a starting mode and to pass all of the supply voltage during a normal driving mode.

51. The single-phase electric motor according to claim 50, wherein the voltage dropping unit is a resistance device with a resistance which is in inverse proportion to a temperature.

52. The single-phase electric motor according to claim 51, wherein the resistance device is an NTC.

* * * * *